(12) United States Patent
Zuffa (10) Patent No.: US 6,767,201 B2
(45) Date of Patent: Jul. 27, 2004

(54) CARROUSEL APPARATUS FOR MANUFACTURING, BY COMPRESSION MOLDING, PLASTICS ITEMS

(75) Inventor: Zeno Zuffa, Borgo Tossignano (IT)

(73) Assignee: Sacmi Cooperativa Meccanici Imola S.c.r.l., Imola (IT)

( * ) Notice: Subject to any disclaimer, the term of this patent is extended or adjusted under 35 U.S.C. 154(b) by 179 days.

(21) Appl. No.: 10/182,465

(22) PCT Filed: Nov. 29, 2001

(86) PCT No.: PCT/IB01/02260

§ 371 (c)(1),
(2), (4) Date: Jul. 29, 2002

(87) PCT Pub. No.: WO02/45934

PCT Pub. Date: Jun. 13, 2002

(65) Prior Publication Data

US 2003/0003183 A1 Jan. 2, 2003

(30) Foreign Application Priority Data

Dec. 4, 2000 (IT) .................................... B02000A0704

(51) Int. Cl.[7] .......................... B29C 43/08; B29C 43/42
(52) U.S. Cl. ...................... 425/350; 425/351; 425/422; 425/438; 425/441; 425/DIG. 58
(58) Field of Search .............................. 425/350, 351, 425/422, 438, 441, 443, DIG. 58

(56) References Cited

U.S. PATENT DOCUMENTS

| 4,570,897 A | * | 2/1986 | Von Holdt | 425/438 |
| 4,640,673 A | * | 2/1987 | Takeda et al. | 425/348 R |
| 4,777,004 A | * | 10/1988 | Galer | 425/438 |
| 5,281,385 A | * | 1/1994 | Julian | 425/438 |
| 5,536,161 A | * | 7/1996 | Smith | 425/438 |
| 5,786,079 A | | 7/1998 | Alieri | 425/349 |
| 6,416,315 B1 | * | 7/2002 | Ciccone | 425/438 |
| 6,585,508 B1 | * | 7/2003 | Zuffa | 425/350 |

FOREIGN PATENT DOCUMENTS

| EP | A-0 355 235 | 2/1990 |
| HU | P9802124 | 5/1999 |
| HU | P9901143 | 8/1999 |
| HU | P0104931 | 4/2002 |
| WO | A-97 27037 | 7/1997 |

* cited by examiner

Primary Examiner—James P. Mackey
(74) Attorney, Agent, or Firm—Guido Modiano; Albert Josif; Daniel O'Byrne (57) ABSTRACT

An apparatus for manufacturing plastics items provided with external undercuts, comprising at least one compression molding unit, which is composed of an upper male mold part comprising a plug and of a lower female mold part aligned, along a vertical axis, with the male mold part, means for actuating the mold parts between a spaced position, at which a dose of plastics sufficient to form an item is deposited in the female mold part, and a mating position for producing the compression molding of an item, the male mold part comprising a plug and an ejector that is associated with the plug in order to remove the molded item when the mold parts are in the spaced position, further comprising a bushing that is arranged externally and coaxially to the plug, a plurality of sectors for forming raised portions and undercuts on the outer surface of the item, the sectors being coupled axially to the bushing and being able to expand with respect to the plug, means for actuating the sectors between a position that produces mating with the plug in order to allow the compression molding of the item and the molding of the raised portions and undercuts, and a spaced position in order to allow to remove the molded item from the plug.

6 Claims, 8 Drawing Sheets

CARROUSEL APPARATUS FOR MANUFACTURING, BY COMPRESSION MOLDING, PLASTICS ITEMS

BACKGROUND OF THE INVENTION

The present invention relates to a carrousel apparatus for manufacturing, by compression molding, plastics items.

Compression molding apparatuses generally comprise a carrousel, which can rotate about a vertical axis and on which a plurality of angularly spaced molding units are installed. Each unit comprises an upper male element (plug) aligned with a lower female mold part (cavity).

In order to obtain the item, a dose of semifluid plastics is introduced in the female mold part and is pressed by means of a relative movement of the two mold parts in order to obtain the item.

In the manufacture of caps for closing containers provided with internal undercuts (for example screw caps), the molded cap, after the mold parts have been opened, remains attached to the plug and is removed by means of an ejector, utilizing the elasticity of the plastics that has not yet hardened.

In the case of caps having external undercuts, it is not possible to perform removal by simply pushing downward the ejector, since the cap cannot retract inward.

SUMMARY OF THE INVENTION

The aim of the present invention is to obviate the above cited drawbacks of known devices, i.e., to provide a carrousel apparatus provided with means that allow to form items, particularly hollow items, such as caps provided with raised portions and undercuts on their outer surface.

Within this aim, an object of the present invention is to provide an apparatus in which the cap forming means assist the extraction of the molded caps from the mold.

This aim and this object are achieved by the present apparatus, whose characteristics are defined in the appended claims.

BRIEF DESCRIPTION OF THE DRAWINGS

Further characteristics and advantages will become better apparent from the detailed description of a preferred but not exclusive embodiment of a carrousel apparatus for manufacturing screw caps by compression molding of plastics, illustrated only by way of non-limitative example in the accompanying drawings, wherein.

DESCRIPTION OF THE PREFERRED EMBODIMENTS

With reference to FIGS. 1 to 5, the apparatus is constituted by a carrousel, which rotates about a vertical axis Z and supports peripherally a plurality of units S for the molding of caps that consist of screw caps A made of plastics. One of said caps is illustrated more clearly in FIG. 8.

Hereinafter, it is assumed that said caps A are composed of a cup B provided with an internal thread C and of a tamper-evident band D provided with inner teeth E and with an outer annular ridge F. The band D forms, together with the rim of the cup, an outer step G.

Each unit S is composed of an upper male mold part, generally designated by the reference numeral 1, and of a lower female mold part, generally designated by the reference numeral 2, which are mutually coaxial along an axis X that is parallel to the axis Z. The female mold part 2 can be actuated against the male mold part 1 by means of a hydraulic jack, which is not shown.

The male mold part 1 comprises a plate 3 (see FIG. 3), which is screwed, by means of a tubular tang 4, into a sleeve 5b, which is in turn screwed to the lower end of a sleeve 5a so as to form a single hollow stem 6 (FIG. 1).

Figure 1:
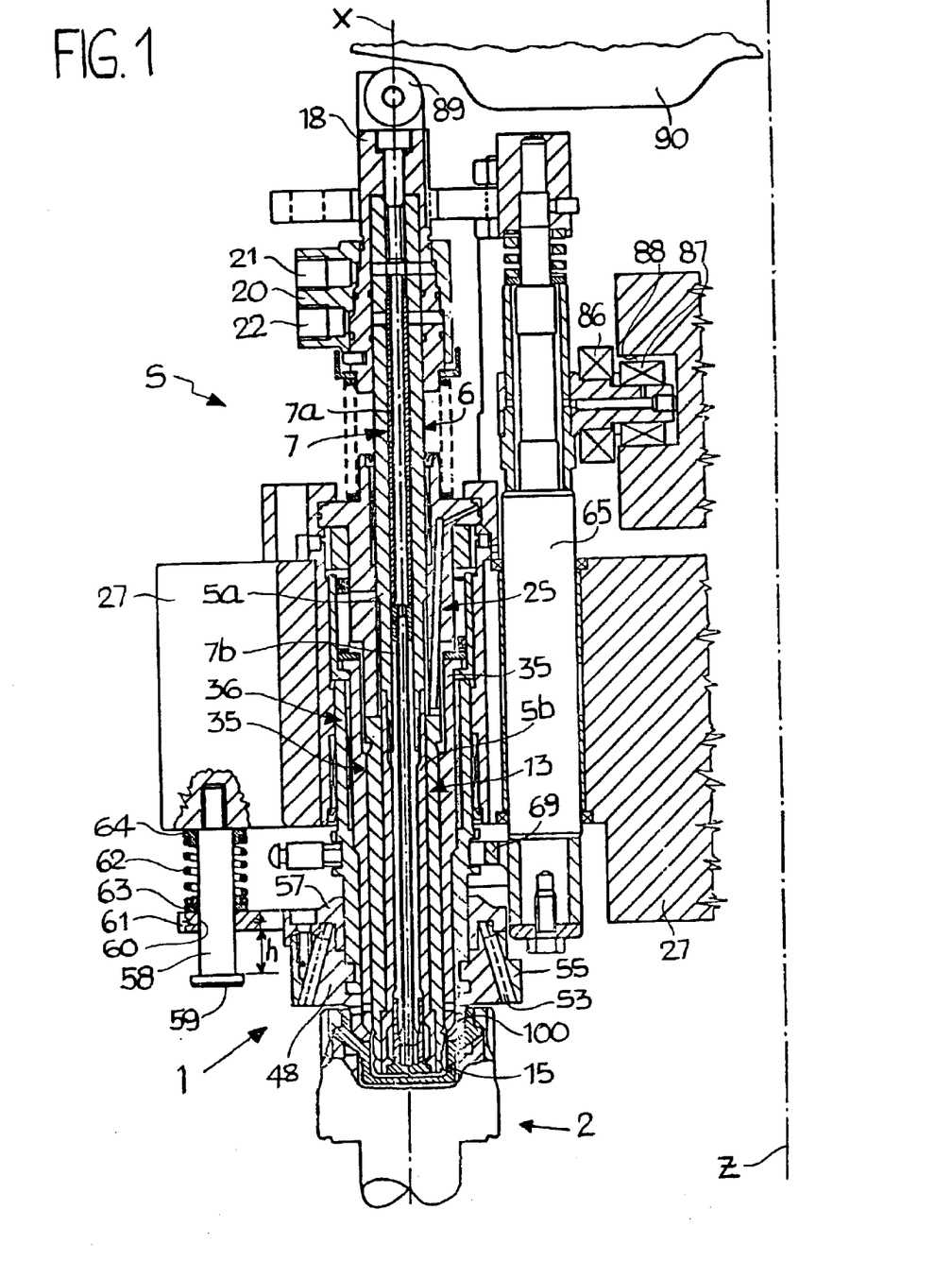
FIG. 1 is a sectional view, taken along a vertical plane, of a molding unit of the apparatus.
Figure 2:
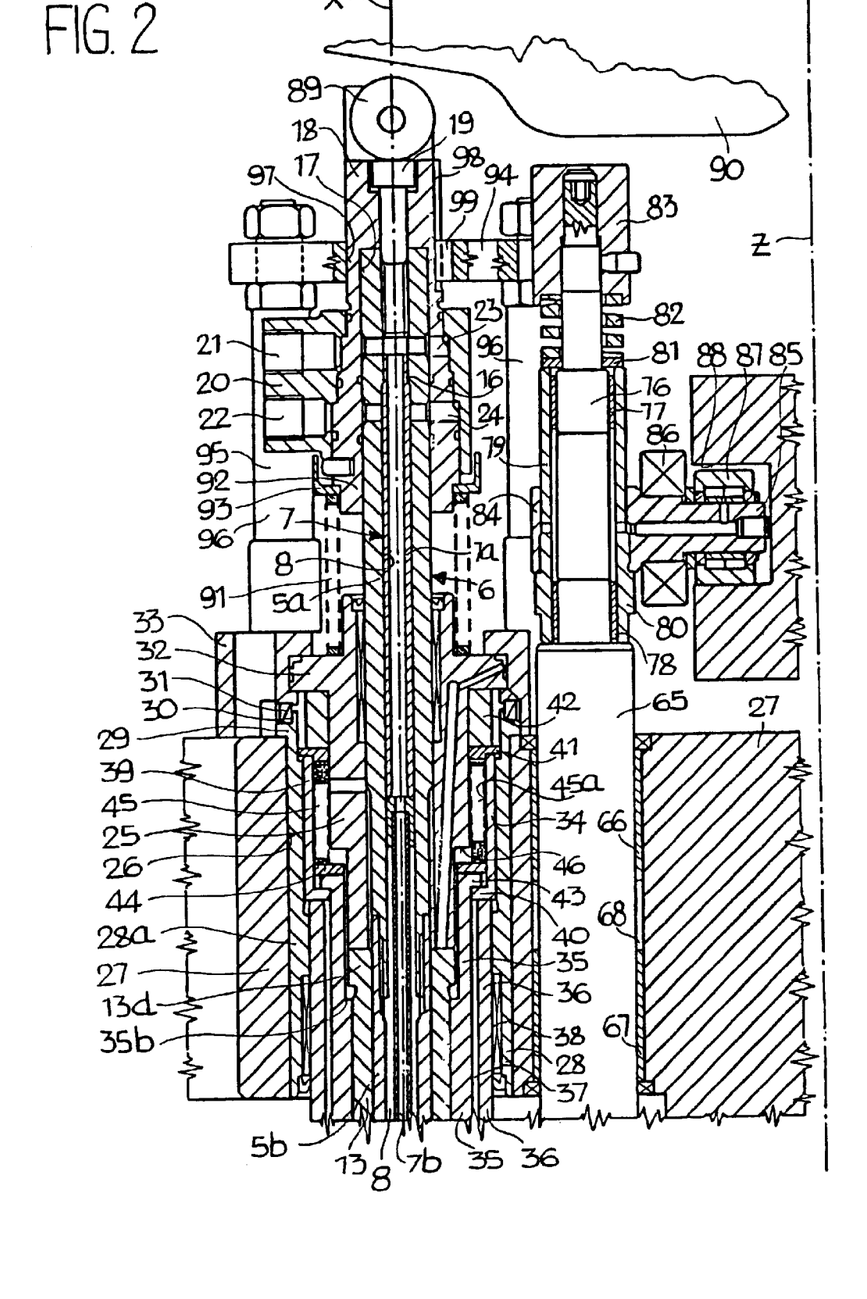
FIG. 2 is an enlarged-scale view of the upper part of the unit of FIG. 1.
Figure 3:
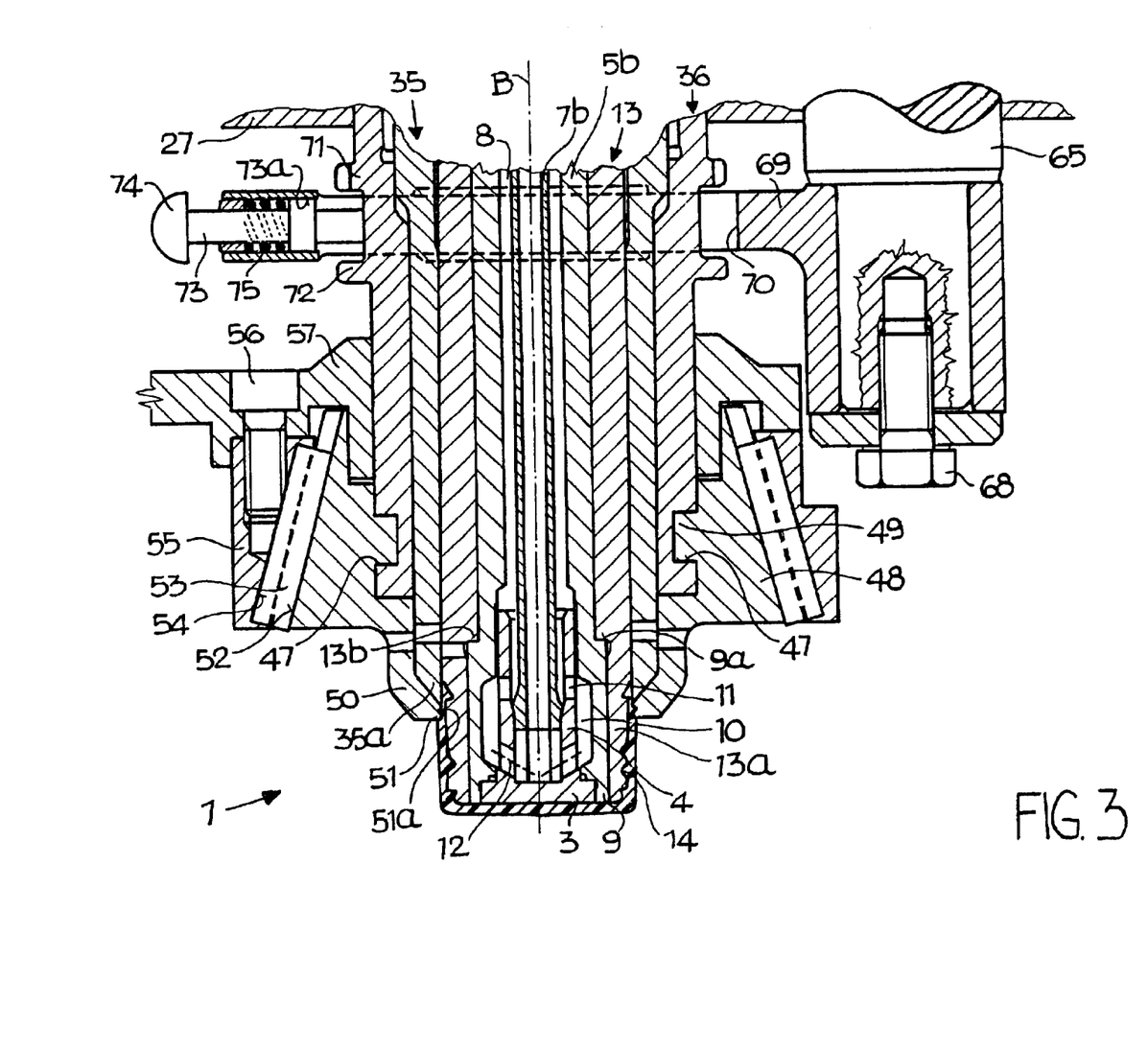
FIG. 3 is an enlarged-scale view of the lower part of the unit of FIG. 1.
Figure 4:
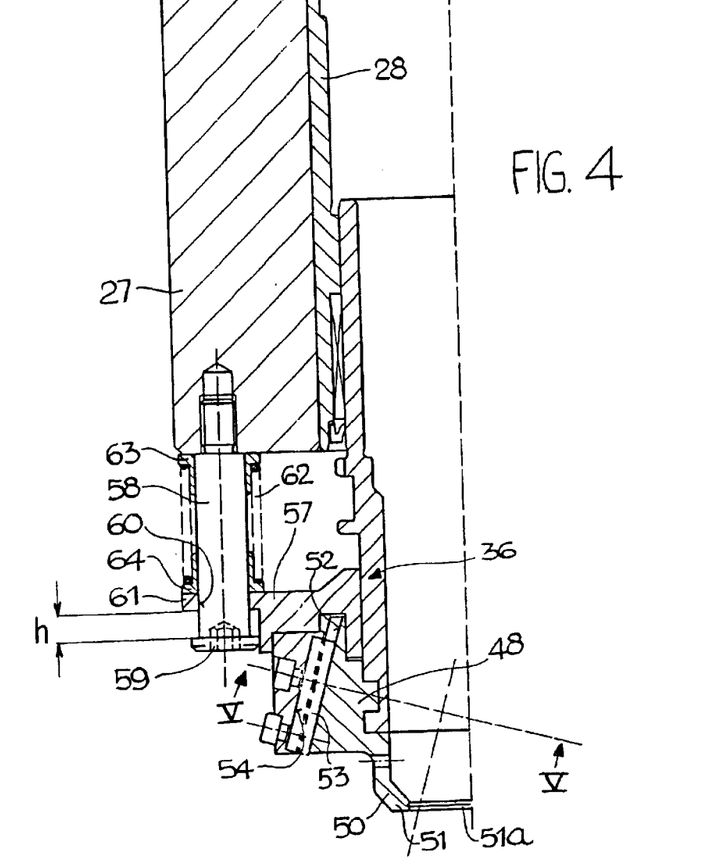
FIG. 4 is a sectional view of a detail of the unit of FIG. 1.
Figure 5:
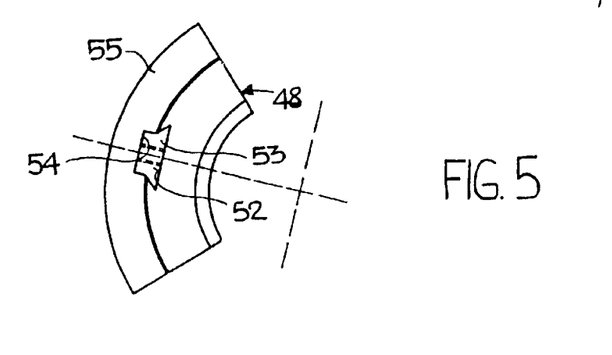
FIG. 5 is a sectional view, taken along the line V—V of FIG. 4.

A hollow tube 7 is inserted hermetically in the tubular tang 4 and is composed of two portions 7a and 7b which are screwed together; said hollow tube forms, together with the hollow stem 6 (i.e., with the sleeves 5 and 5a), a tubular interspace 8. The sleeve 5b has, at its lower end, a wider portion 9 in which the plate 3 is centered hermetically. The wider portion 9 with the tubular tang 4 forms a chamber 10 that is connected to the interspace 8 through openings 11 of the tang 4. Furthermore, the chamber 10 is connected to the inside of the hollow tube 7 through openings 12 formed in the region of the tang 4 directly above the plate 3.

Figure 6:
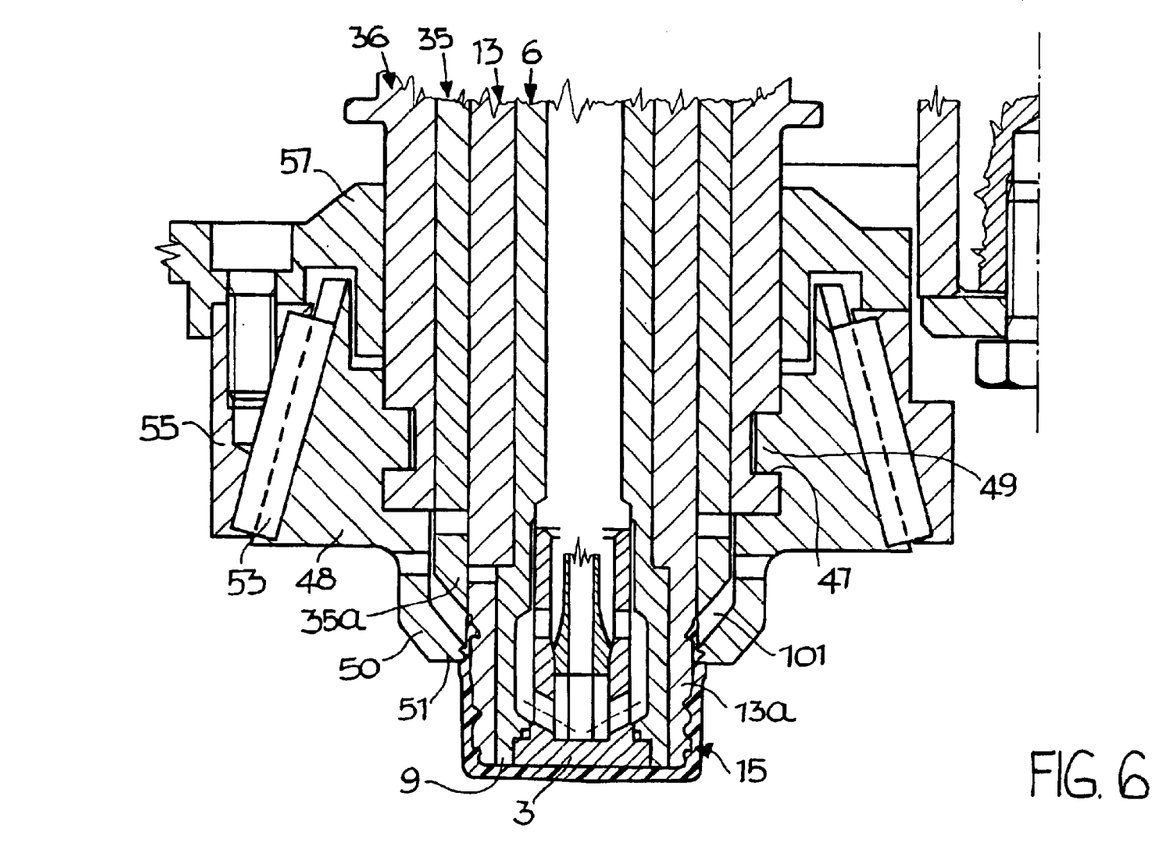
FIGS. 6, 7 and 8 are views of the lower part of the unit in three successive operating conditions.
Figure 8:
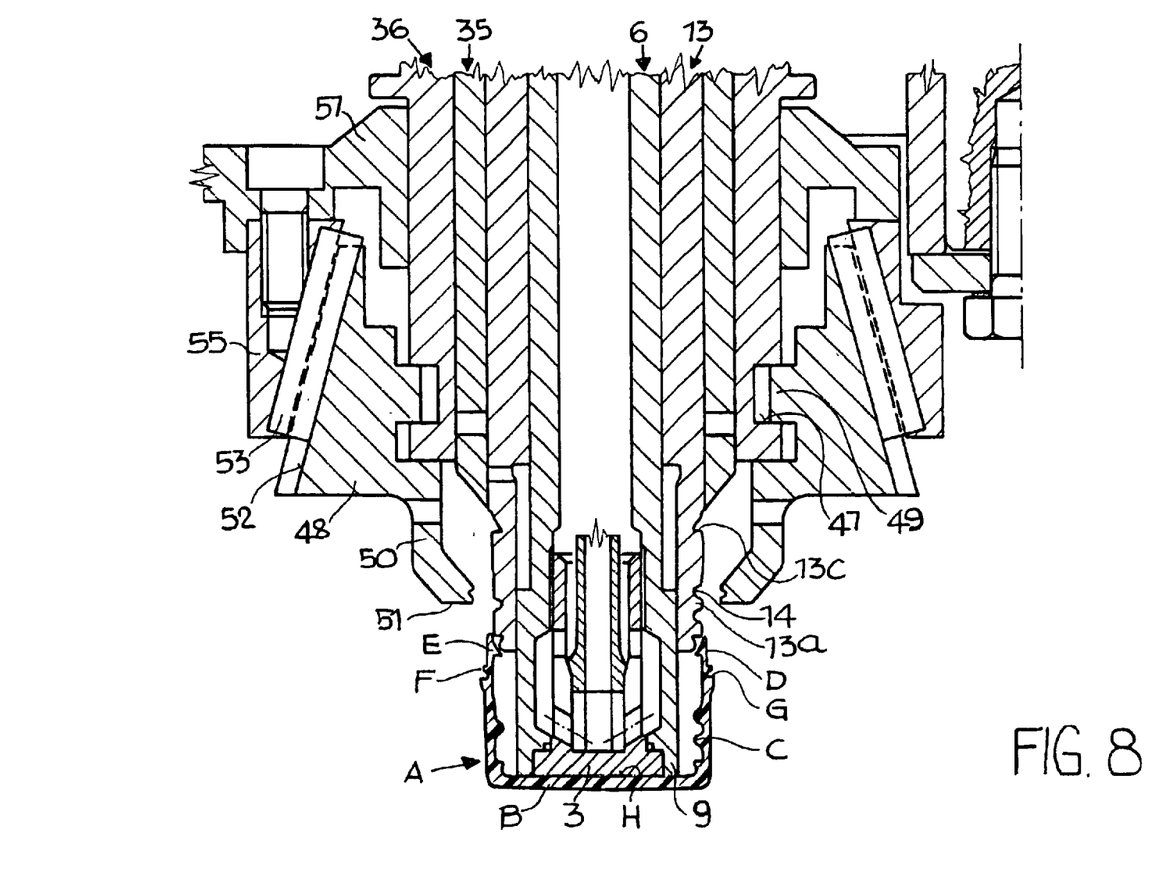

The wider portion 9 forms, together with the sleeve 5b of the hollow stem 6, a step 9a for resting thereon the shoulder 13b of a tubular element 13 provided with a lower portion 13a that is shaped so as to have a helical outer slot 14 and recesses 13c which are distributed peripherally (see FIG. 8). As shown more clearly hereinafter, the hollow stem 6 is controlled by actuation elements which, starting from a position in which the step 9a abuts against the shoulder 13b, impart thereto a downward stroke, which allows the plate 3 and the wider portion 9 to descend below the portion 13a. In this manner, the step 9a abuts against the shoulder 13b. The portion 13a and the plate 3, together with the edge of the cylindrical wider portion 9 in which it is centered, form the forming plug 15 (see FIG. 6) that determines the internal profile of the cap A, i.e., the thread C, the bottom H of the cup B, and the internal protrusions of the tamper-evident band D for retaining the cap on the container to which it is applied. In the illustrated example, said protrusions, in order to match the recesses 13c, consist of teeth E (see FIG. 8), but they can have any shape and in particular they can be constituted by an annular lip.

When the hollow stem 6 is actuated so as to descend, the plate 3 and the cylindrical wider portion 9 protrude from the tubular portion 13a and, by acting on the bottom H of the cap A, act as an ejector for said cap, hereinafter designated by the reference numerals 3 and 9.

The upper end of the portion 7a of the hollow tube 7 is connected hermetically in a seat 16 (see FIG. 2) of the top of the stem 6, which is in turn inserted hermetically in a seat 17 of a body 18 and is retained by a screw 19. A connector 20 is arranged on the body 18, and two holes 21, 22 are formed therein; said holes are connected to the delivery and to the return of a cooling liquid. The holes 21, 22 are connected to the hollow tube 7 and the tubular interspace 8 by means of passages 23, 24 of the body 18 and of the stem 6, so as to convey the cooling liquid into the chamber 10 and ensure the cooling of the plug 15 and the setting of the plastics of which the cap A is made.

The hollow stem 6, with its portion 5a, is guided slidingly in a tubular element or sleeve 25, which is accommodated coaxially in a cylindrical seat 26 of a supporting body that is part of the structure of the carrousel. In practice, said body is constituted by a sort of rotary drum 27, which is mounted on a vertical shaft whose axis Z is the rotation axis of the carrousel. The sleeve 25 is suitable, with its lower end, to act as an abutment for the tubular element 13 during the molding of the cap A.

A bush 28 is inserted in the seat 26 and abuts, with an upper annular lip 29, on the edge of the seat 26. An external flange 32 of the sleeve 25 rests on the annular lip 29, with the interposition of a ring of elastic material 30 and of a spacer ring 31. Retention elements 33 engage on the flange 32 and, by means of screws (not shown in the drawing), lock on the upper face of the drum 27 the sleeve 25 and the bush 28 coaxially to each other and to the seat 26.

The bush 28 forms, together with the tubular element 23 and the sleeve 25, a compartment 34 in which there is a tube 35, which can slide on the tubular element 13, and there is a bushing 36, which can slide on the tube 35. The lower end 35a of the tube 35 is chamfered externally in a conical fashion.

Axial sliding bearings 37, 38 are interposed between the tube 35 and the bushing 36 and between said bushing and the bush 28.

In the compartment 34, above the bushing 36, there is a cylindrical case 39, which rests, with a lower inner lip 40, on the top of the bushing 36. A center bearing 41 is centered on the case 39, and a ring 42 of elastic rubber-like material is interposed between said center bearing and the flange 32 of the sleeve 25.

The tube 35 has, at the top, an outer lip 43 for abutment on the inner lip 40 of the case 39, which supports a center bearing 44 for the resting of a cylindrical spring 45. The spring 45 is accommodated in an annular chamber 45a comprised between the sleeve 25 and the case 39 and abuts against the center bearing 41. The compression strokes of the spring 45, i.e., the upward strokes of the tube 35, are limited by the abutment of the center bearing 44 against a shoulder 46 of the sleeve 25.

The tube 35 has, at its lower end, a circular hollow 47 (see FIG. 3) for the vertical retention of four sectors 48, which are arranged so as to constitute a forming ring for a region of the tamper-evident band D of the plug A and at the same time act as an aid for the ejection of the cap A performed by the plug 15 after molding the plastics and opening the mold.

The sectors 48 cover a 90° angle about the axis X and are provided with collars 49, which engage in the hollow 47.

Furthermore, the sectors 48 protrude downward, beyond the lower end of the sleeve 35, with a conical segment 50, which ends with an edge 51 that is concentric to the axis B and is provided with a slot 51a, which faces the portion 13a of the tubular element 13. The edge 51 therefore allows to form, on the outside of the cap A, the step G and the collar F, i.e., undercuts which, in conventional molds, contrast the extraction of the molded item.

The ring constituted by the sectors 48 is substantially frustum-shaped, and on the outer surface of each sector there is a dovetail slot 52, which lies on a radial plane that passes through the axis X. The slots 52 constitute sliding guides for keys 53, which are fixed in seats 54 of a conical ring 55 that is centered and fixed by means of screws 56 coaxially to the axis X under a plate 57, which is slidingly guided on the bushing 36.

The keys 53 diverge downward with the same angle as the slots 52, so that when the bushing 36 is actuated so as to descend, the sectors 48 move mutually apart in a radial and circumferential direction and remain engaged axially with the hollows 47 by means of the collars 49.

The plate 57 is rigidly coupled to the rotary drum 27 by means of a pin 58 (see FIGS. 1 and 4), which is fixed with one end under said drum and is provided, at its opposite end, with a mushroom-like part 59. The pin 58 can slide in a hole 60 formed in a wing 61 of the plate 57, and on the portion of the pin 58 that lies between the wing 60 and the drum 27 there is a spring 62 which, by means of its opposite ends, rests on the wing 61 and on the drum 27, with bushings 63 and 64 interposed.

The spring 62 keeps the plate 57 rested on the sectors 48, which accordingly, during the descent of the bushing 36, remain closed in a ring-like arrangement until the wing 61 abuts against the mushroom-like part 59 of the pin 58.

When the wing 61, after performing a stroke "h" from a preset raised position, abuts against the mushroom-like part 59, by means of the additional stroke of the bushing 36 the sectors 48 are forced, by the engagement of the keys 53 in the slots 52, to follow a path that diverges downward and causes the edges 51 to be spaced from the lower threaded portion 13a of the tubular element 13. In order to actuate the bushing 36 there is a column 65 (see FIG. 2), which can slide, by means of bearings 66 and 67, in a seat 68 of the drum 27 that is parallel to the seat 26 and whose axis is radially internal with respect to the axis X of the unit S.

An arm 69 (see FIGS. 1 and 3) is fixed to the lower end of the column 65 by means of a screw 68 and is provided with an opening 70, through which the bushing 36 is guided. The opening 70 is shaped so that its edge remains gripped between two collars 71, 72 of the bushing 36, so as to provide an axial connection thereof with the column 65. The sleeve 36 can be positioned at an angle to the arm 69 by means of a pin 73, which is guided in a radial hole 73a of the arm 69 and is provided with a knob 74; by acting on said knob in contrast with a return spring 75, it is possible to cause the engagement of the pin 73 in any one of a plurality of holes formed in the sleeve 36 between the collars 71 and 72.

The column 65 protrudes above the drum 27 with a tang 76 (see FIG. 2), which slidingly supports, with the aid of bearings 77 and 78, a sleeve 79. The sleeve 79 has a collar, which acts as a shoulder 80, and is surmounted by a washer 81 that rests on the upper edge of the sleeve 79. A precompressed spring 82 rests on the washer, and its top end rests against a bushing 83, which is fixed to the upper end of the tang 76 in an adjustable manner in order to be able to adjust the precompression of said spring 82.

A ring 84 is screwed onto the sleeve 79 until it abuts against the shoulder 80, and a stem 85 protrudes from said ring 84 and supports two rollers 86, 87. The roller 87 is engaged in a cam 88, which is rigidly coupled to the fixed structure of the apparatus and is therefore stationary with respect to the drum 27. The roller 86 is guided in a vertical slot of a bracket (not shown in the drawing), which is fixed on the drum 27 and is meant to prevent the rotation of the sleeve 79 with respect to the tang 76.

The cam 88 has a circular extension that is concentric with respect to the axis Z of the carrousel, so as to produce axial movements of the column 65, and, by way of the connection provided by the arm 69, of the bushing 36.

The axial movement of the bushing 36 is combined with the movement of the ejector 3, 9. For this last movement, there is a roller 89, which is mounted on the cylindrical body 18 at the top end of the stem 6 and is capable of following an axial cam 90, which is also stationary and concentric with respect to the cam 88.

The roller 89 is retained on the profile of the cam 90 by a spring 91, which rests on the flange 32 in a downward region and on a shoulder 92 of the body 18, with a cup-shaped washer 93 interposed, in an upper region.

In order to prevent the rotation of the stem 6 and of the body 18 about their own axis, there is a bridge 94, which is fixed to the top of two columns 95, 96 and has an opening 97 through which the cylindrical body 18 is slidingly guided.

An axial slot 98 is formed in the outer surface of the cylindrical body 18, and a key 99 slidingly engages therein; said key is fixed to the bridge 94 and protrudes into the opening 97, allowing the body 18 to slide, but not rotate, in the opening 97.

The operation of the described apparatus is as follows. During the rotation of the carrousel, a dose of plastics having a pasty consistency is deposited in the cavity of the female mold part 2. In this step, the female mold part 2 is lowered with respect to the male mold part 1, while the plug 15, by means of the spring 91, is actuated into the upward stop position determined by the abutment of the step 9a of the portion 9 against the shoulder 13b of the tubular element 13 and of the top end thereof against the lower end of the sleeve 25.

In this stop position, the lower end 35a of the tube 35 lies above the edges 51 of the sectors 48, in front of the recesses 13c of the portion 13a.

When the female mold part 2 is lifted hydraulically, the edges 51 of the sectors 48 initially abut against the shoulder 100 of the mold part 2 (see FIG. 1) and then against the lower end 35a of the tube 35, thus delimiting the cap forming chamber. As the upward motion of the female mold part 2 continues, the plastics is distributed into the forming chamber, filling it and causing, owing to its own incompressibility, the female mold part to stop in the final position, in which the cap A has assumed its final shape.

It should be noted that the spring 45, by acting on the tube 35 and, by means of the lip 44 of the case 39, on the bushing 36, keeps the edges 51 rested on the shoulder 100 and allows to vary the volume of the forming chamber according to the quantitative variations of the dose of plastics that is deposited in the cavity of the female mold part.

When the plastics has reached a suitable setting point, determined by feeding cooling liquid into the chamber 10 and into the similar chamber of the female mold part, so that plastic deformations of the cap are no longer a concern, the descent of the female mold part 2 is actuated. However, the cap A is retained on the plug 15 by the engagement of the thread C in the slot 14 of the portion 13a and by the retention of the tamper-evident band D between the outer surface composed of the edges 51 of the sectors 48 and the conical end 35a of the tube 35 and the inner surface, composed of the region of the portion 13a that is provided with the recesses 13c.

When the female mold part 2 is spaced sufficiently from the plug 15, the downward movement of the column 65 and of the hollow stem 6 is actuated by means of the cams 88 and 90.

The descent of the hollow stem 6 causes (see FIG. 6) the lowering of the plug 15 to the stroke limit level, at which the tamper-evident band D lies below the conical end 35a of the tube 35. At the same time, the descent of the column 65, by means of the arm 69, determines the descent of the bushing 36 and the downward actuation of the sectors 48.

The descent stroke of the column 65 comprises a first portion, which is equal to the stroke of the plug 15, during which the conical ring 55, by way of the spring 62 that acts on the wing 61 of the plate 57, remains engaged on the sectors 48 and prevents their opening. During said first portion, the descent of the sectors 48 is accompanied by the descent of the plug 15 and the edges 51 therefore remain in resting contact on the step G of the molded cap A.

At the end of the first portion of the stroke, the wing 61 abuts against the mushroom-like part 59 of the pin 58, which stops the descent of the plate 57 and of the ring 55, while the tubular element 13, by way of the presence of a top collar 13d (see FIG. 2) that abuts on a shoulder 35b of the tube 35, stops with respect to the stem 6.

In particular, it should be noted that the descent of the tube 35 is prevented by the abutment of the outer lip 43 against the inner lip 40 of the case 39, which in the meantime, by means of the spring 45, has moved so as to rest against the internal shoulder 28a of the bush 28.

The halting of the tube 35 allows the formation, above the edges 51, of an annular opening 101 (see FIG. 6), into which the tamper-evident band D can expand in order to allow the teeth E to protrude from the respective recesses 13c of the portion 13a.

Figure 7:
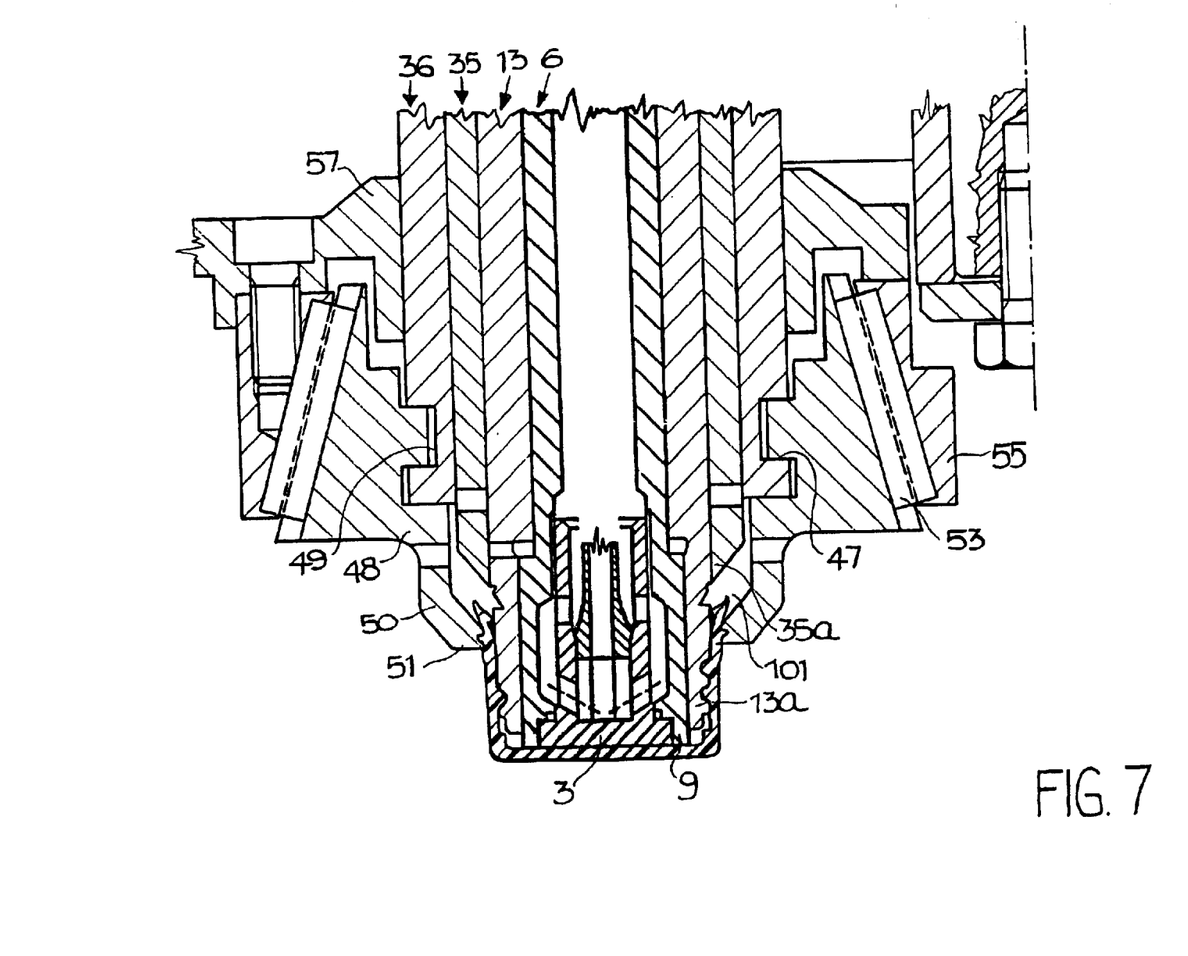

With the second portion of the descent stroke of the column 65 and of the hollow stem 6 (see FIG. 7), the thrust applied to the sleeve 36 and to the stem 6 actuates downward the sectors 48 and the ejector 3, 9, which by acting respectively on the step G and on the bottom H of the cap A cause the disengagement of the thread C from the slot 14 and of the teeth E from the respective recesses 13c of the portion 13a, allowed by the elasticity of the plastics, which allows the cup B to expand radially and allows the tamper-evident band D to open out into the opening 101.

As they continue their descent, the sectors 48 are forced, by the oblique orientation of the guides 52 and 53, to move further away from the peripheral region of the cap until they leave the step G. At this point, the complete extraction of the cap A is entrusted solely to the ejector 3, 9, whose thrust continues until the teeth E have descended below the lower edge of the portion 13a, beyond which the cap A can fall freely into a collection area.

It is evident that the fundamental prerogative of the present invention is that the sectors 48 allow to act both as elements for forming undercuts that lie externally with respect to the cap and as elements that assist cap extraction. The thrust applied axially to the cylindrical wall of the cap by the sectors 48 in fact facilitates the widening of the cap that is required in order to allow the ejector 3, 9 to force the exit of the thread C from the helical slot 14 without causing the material of the cap to yield.

By contrast, it should be noted that in conventional molding units, in which cap extraction is entrusted solely to the ejector, the thrust applied by said ejector to the bottom of the cap causes the cylindrical wall of the cup B to clamp more tightly onto the tubular portion 13a. This fact obviously requires more force to remove the thread C from the slot, with severe consequences for the integrity of the cap.

The described apparatus is susceptible of numerous variations in order to deal with the different types of product.

Figure 9:
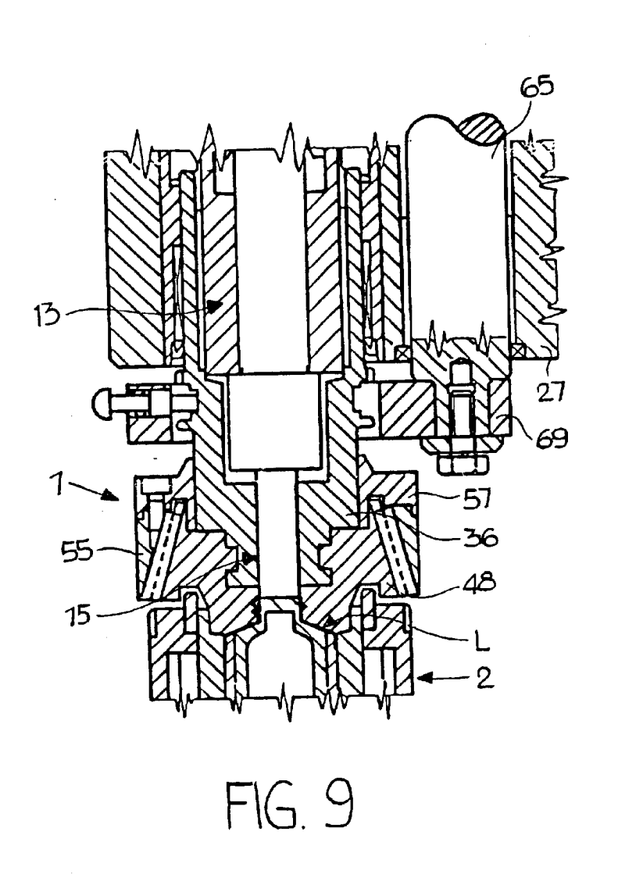
FIGS. 9 and 10 are two sectional views, taken along a vertical plane, of the lower part of a second embodiment.
Figure 10:
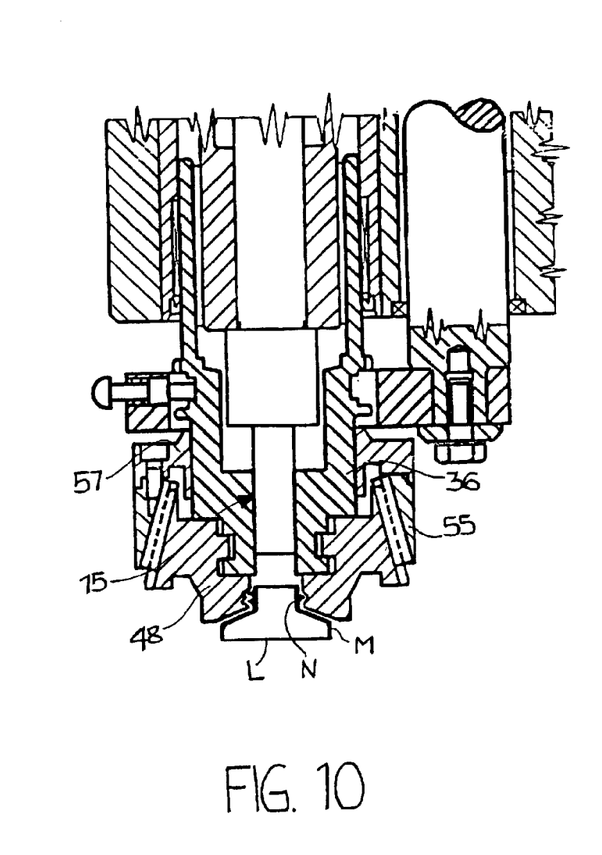

FIGS. 9 and 10 are sectional views of the lower part of a unit for the compression molding of the lower part L of a container made of plastics, which is composed of a frustum-shaped plate M and an externally threaded neck N.

In FIGS. 9 and 10, the elements constituting the unit that are identical or equivalent to those of the unit shown in FIGS. 1 to 8 are designated by the same reference numerals.

As clearly shown, the unit of FIGS. 9 and 10 is constructively simpler, owing to the fact that the part L to be molded is not provided with inner undercuts which, in order to be able to disengage from the respective molding recesses of the plug 15 during part extraction, would have to be able to expand outward, as allowed for example by the end 35a of the tube 35 of the molding unit described earlier. The absence of the inner undercuts therefore allows to remove the part simply by opening the conical segments 51.

The disclosures in Italian Patent Application No. BO2000A000704 from which this application claims priority are incorporated herein by reference.

What is claimed is:

1. An apparatus for manufacturing plastics items provided with external undercuts, comprising at least one compression molding unit, which is composed of an upper male mold part comprising a plug and of a lower female mold part aligned, along a vertical axis, with said male mold part, means for actuating said mold parts between a spaced position, at which a dose of plastics sufficient to form an item is deposited in the female mold part, and a mating position for producing the compression molding of an item, said male mold part comprising a plug and an ejector that is associated to with said plug in order to remove said molded item when said mold parts are in said spaced position, further comprising a bushing that is arranged externally and coaxially to said plug, a plurality of sectors for forming raised portions and undercuts on the outer surface of said item, said sectors being coupled axially to said bushing and being able to expand with respect to the plug, means for actuating said sectors between a position that produces mating with said plug in order to allow the compression molding of said item and the molding of said raised portions and undercuts, and a spaced position in order to allow to remove said molded item from said plug.

2. The apparatus according to claim 1 for manufacturing hollow items, such as caps for closing containers, comprising a plurality of compression molding units arranged on a carrousel that rotates about a vertical axis, each unit comprising an upper male mold part and a lower male mold part, which are aligned along an axis that is parallel to said rotation axis of the carrousel, means for actuating said molds between a spaced position, at which a dose of plastics sufficient to form an item is deposited in the female mold part, and a mating position in order to determine the compression molding of said caps, said male mold part comprising a tubular element that ends with a tubular portion that is contoured for the internal profile of said items and forms a plug with an ejector associated with a tubular stem which is guided in said tubular portion and is actuated by cam means between a position for completing the inner profile of said items and a position for removing said items from said tubular portion, further comprising: a bushing, which is arranged externally and coaxially to said tubular element; a plurality of sectors for forming raised portions and undercuts on the outer surface of said items, said sectors being retained axially to said bush and being able to expand with respect to said tubular portion; means for actuating said sectors between a position for mating with said tubular portion in order to allow the compression molding of said items and the formation of said raised portions and undercuts on the outer surface of said items, and a spaced position in order to allow the removal of said molded items from said plug.

3. The apparatus according to claim 2, wherein said actuation means of said sectors, for each molding unit, comprise an element which is guided on said bushing and is rigidly coupled to said sectors by inclined guides which lie on planes that are radial to the axis of said plug and converge on it, said bushing being axially rigidly coupled to a column, which is guided in said carrousel and is controlled by cam means suitable to actuate said element in order to move said sectors along said guides between said mating position and said spaced position with respect to said tubular portion.

4. The apparatus according to claim 3, wherein elastic means are arranged between said element and said carrousel and act on said element so as to keep said sectors mated with said tubular portion during the molding of the items and along a first portion of the ejection stroke of said ejector, a stroke limiter being provided for said element and being arranged so as to determine, along a second portion of the ejection stroke of said ejector, the sliding of said sectors along said inclined guides and the expansion of said sectors in said spaced position in order to allow to remove the formed items by means of said ejector.

5. The apparatus according to claim 4, wherein said elastic means are constituted by a spring, which is mounted on a pin fixed to said carrousel and is interposed between said carrousel and said element, said pin being provided with said stroke limiter for said element.

6. The apparatus according to claim 5 for manufacturing screw caps for closing containers, said caps comprising a cylindrical cup provided with an internal thread and with a tamper-evident band with internal protrusions and external raised portions and undercuts, comprising a plurality of compression molding units arranged on a carrousel that rotates about a vertical axis, each unit comprising an upper male mold part and a lower female mold part, which are aligned along an axis that is parallel to said rotation axis of the carrousel, means for the hydraulic lifting of said female mold part between a lowered position, at which a dose of plastics sufficient to form a cap is deposited in the female mold part, and a mating position, for producing the compression molding of said caps, said male mold part being constituted by a plug that is composed of: a tubular element, which ends with a contoured tubular portion provided with a helical slot and with recesses for forming the thread and, respectively, internal protrusions of said caps; a hollow stem, which is guided in said tubular element and has an end controlled by an actuation cam and an opposite end provided with an ejector accommodated slidingly in said tubular portion; a tube, which can slide on said tubular element and has an end that can be superimposed on said recesses; a bushing, which can slide on said tube; a plurality of sectors, which are axially retained on said bushing and can expand radially with respect to said tubular portion, said sectors being provided with segments that form edges that protrude toward said tubular portion at a level below said end of said tube; and an element for actuating the sectors of each molding unit, which is guided on said bush and rigidly coupled to said sectors by inclined guides, which lie on planes that are radial to the axis of said plug and converge toward a point of said axis, said bushing being axially rigidly coupled to a column, which is guided in said carrousel and is controlled by cam means for controlling said element, said cam means, for controlling said element and said ejector being mutually coordinated so that when the female mold part rises in the position for closing the mold, said edges and said ends of the tube are arranged opposite said recesses in order to allow the formation of the tamper-evident band, while when the female mold part descends into the mold opening position, said tubular portion and said sectors descend with respect to said tube so as to form an opening between said edges and said end and the positioning of said tamper-evident band at said opening, then the disengagement of said edges of the sectors from the formed cap, and finally the removal of the cap from said tubular portion.

* * * * *